Patented Aug. 25, 1936

2,052,093

UNITED STATES PATENT OFFICE 2,052,093

CONDENSATION PRODUCT AND PROCESS FOR PREPARING THE SAME

Herbert Hönel, Detroit, Mich., assignor to Beck, Koller & Company, Inc., Detroit, Mich., a corporation of Delaware No Drawing. Original application September 9, 1927, Serial No. 218,587. Divided and this application November 21, 1932, Serial No. 643,793. In Austria August 6, 1927

50 Claims. (Cl. 260—2)

The invention relates to improvements in condensation products and the process of making the same. The present application is a division of my application Serial No. 593,189, filed Feb. 13, 1932, and of my application Serial No. 506,297, filed Jan. 2, 1931, which in turn are divisions of an earlier application Serial No. 218,587, filed Sept. 9, 1927, now Patent 1,800,295, granted Apr. 14, 1931.

The claims of the present application are directed principally to condensation products which are formed by the reaction of a phenol formaldehyde condensation product of the heat hardening type with a resinous ester, more particularly such as is formed from a natural resin acid and a polyhydric alcohol.

It is known that, in general, phenols and formaldehyde, when treated with alkaline contact agents, furnish condensation products which, according to the conditions employed, are either resinous or merely oily to viscous, and pass over, at higher temperatures, into the infusible and insoluble state. The employment of acid contacts furnishes, under certain conditions, fusible and soluble resins which, as is known, find application in the varnish industry.

It is remarkable that resins prepared from p-cresol and formaldehyde differ decidedly, in point of solubility, from those of equal melting point from phenol or o-cresol, and still more from those prepared from m-cresol. Solubility in alcohol is a property common to them all; but whereas the last-named resins are almost completely insoluble in benzol hydrocarbons, the first-named are completely soluble therein, and even in mixtures of the latter with benzine.

It has now been ascertained that by condensing aldehydes and phenols which are substituted in the p-position by a higher saturated hydrocarbon radicle i. e. containing four to six carbon atoms, resinous products can be obtained which are completely soluble in benzine, and therefore also in oils, and possess highly valuable properties. Such phenols are, in part, easily prepared owing to the special reactivity of the p-hydrogen atom in the molecule.

A process for the production of resins is known and is set forth in German Patent No. 340,989 in which phenols are first condensed with unsaturated hydrocarbons, by the Koenigs method (Ber. vol. 23, p. 3145; vol. 24, p. 179 and 3889 and vol. 25, p. 2649), and then with aldehydes. The first condensation produces a mixture of different materials including some p-substituted phenols. Especially in the case of iso-amylenes, the resulting mixture contains only about 6% of the corresponding p-substituted phenol, the remainder comprising uncombined starting materials, together with ester-like compounds and polymerization products of the iso-amylene. The resins obtained by the above process are also soluble only in benzol, but insoluble in benzine. On the other hand, however, according to the present process, the p-butylphenol obtained from isobutylalcohol and phenol, for example, furnishes with formaldehyde—notwithstanding the smaller aliphatic radicle—a resin which is soluble in benzine in all proportions. As a matter of course, acetaldehyde, for example, furnishes with the same substance a resin which is not less soluble in benzine. Particularly valuable materials are the purified phenols with a p-substituted tertiary radicle, since they furnish with aldehydes very pale resins which are fast to light. Moreover, in order to obtain, with aldehydes, resins of high melting point and satisfactorily soluble in benzine, it is not unconditionally necessary to purify the phenols, prepared in the specified manner, from various by-products, such as those of ethereal character. The starting materials may also consist of phenol mixtures such as crude cresol, it being advisable to take the proportion of phenol and m-cresol into consideration. In such case, the entire reaction mixture, together with the components (p-cresol in particular) which do not enter into the reaction, can be used in the condensation treatment, resins soluble in benzine being nevertheless obtained. The substances (alcohols, haloids, etc.) serving for the substitution of the p-hydrogen atom in the phenol may be used in an unrefined and mixed condition. The substituents may be purely aliphatic or hydroaromatic.

In the acid condensation of formaldehyde with these p-substituted phenols, a certain analogous behaviour with that of their simplest representative, p-cresol, is displaced. Almost equimolecular amounts may be used without fear of producing an infusible resin; whereas phenol and m-cresol in particular must be used in somewhat considerable excess in order to prevent this risk.

In the case of alkaline contact agents, I have now found that the said p-substituted phenols behave in a very similar manner to p-cresol with regard to condensation with formaldehyde. They can be condensed at different temperatures in the presence of varying amounts of alkali, ammonia, etc. with varying amounts of formaldehyde. According to the conditions, oily to solid masses, clear resins or infusible products are obtained. Equimolecular amounts of formaldehyde, or even up to 2 molecules can be taken up at lower temperatures. The method adopted in order to compound a proportion considerably exceeding the equimolecular one, consists in dissolving the phenol substance in alkalies and leaving it in contact with aqueous formaldehyde at a moderate temperature for some time. Even considerably less than equimolecular proportions of alkali will suffice provided uniform solution of the components is effected. The reaction product is finally thrown down from the alkaline solution by means of any acid. The oily or resinous, and still fusible, products may be placed in moulds and transformed into very hard infusible and insoluble resins by the application of heat, preferably accompanied by pressure. The products prepared with more than an equimolecular proportion of formaldehyde become, under this treatment, harder and more elastic than those prepared with only equivalent amounts. Such an excess of formaldehyde is also very useful for the purposes described in the next paragraph. The transition into the infusible state proceeds more slowly than with the known products obtained from phenol and its low homologues. The resinous, still fusible products are just as soluble in benzine and oil as the resins prepared from the same components with acid agents.

Even the slower rate of resinification (i. e. of transition into the infusible state) and other differences in behaviour as compared with the known similar products of the heat hardening type, enlarge the sphere of possible application. Thus, for example, the transition into the insoluble form when heated can be entirely prevented by a whole series of substances, even when operating with already viscous products prepared with an excess of formaldehyde, provided such substances be present in not too small amount. Such substances comprise widely varied artificial and natural, acid, neutral or neutralized resins, waxes, fatty oils, etc. Condensation products of the heat hardening type prepared from common phenols can only be reacted with acidic resins (for example, colophony), but yield with neutral resins, oils, etc., non-homogeneous crumbly masses. It was up to now unknown to obtain useful combination products from heat hardening condensation products and such neutral stuffs.

I have now found that condensation products which belong to the heat hardening type and derived from those substituted phenols mentioned above can be brought into reaction also with these neutral stuffs. The latter undergo highly valuable modifications of their physical and chemical properties, such as melting point, hardness, viscosity, resistance to external influences, etc., even when reacted only with relatively small amounts of the said condensation products. The viscosity of fatty oils is extensively increased. It is known, indeed, that by a high temperature melting treatment coumarone resin, for example, and a powdered infusible resin prepared from m-cresol and formaldehyde with the aid of hydrochloric acid, can form a fusible resin which is soluble in a mixture of benzol and alcohol. According to the present process it is possible to obtain from the common cheap coumarone resin and a small quantity of a condensation product obtained by means of an alkaline catalyst a resin having a considerbly higher melting point and soluble in benzine. It is also known to increase the melting point and hardness of natural acid resins (colophony) by melting them with condensation products of the phenol formaldehyde series which become infusible per se, while at the same time preventing the transition of said condensation products into the infusible form. It is, however, entirely new to work up neutralized, i. e. esterified colophony, or practically neutral natural resins, with similar products in the specified manner. It should be noted that it is very important in preparing the condensation products that there should be present no unsubstituted phenol (hydroxy-benzol) or meta-cresol. Where even a very small quantity of unsubstituted phenol or meta-cresol is present, the condensation product obtained cannot be reacted with neutral resins and oils, owing to the formation of useless sago-like up to clodded infusible and insoluble masses within the melted resin or oil employed.

The solubility conditions of the materials improved by the treatment according to the invention correspond generally to those of the original material. For instance, with resins soluble in benzine, such as colophony-glycerol ester or dammar, end products are obtained which are also soluble in benzine. In case such resins are reacted with condensation products which per se are soluble in benzine (i. e. such as are obtained from the p-tertiary-butylphenol or a higher homologue), the products obtained show an excellent solubility in benzine. A benzine solubility sufficent in practice is also obtained when the condensation products employed to act on the resin are prepared from a phenol substituted in the p-position by a low alkyl radicle or also by an aralkyl radicle which condensation products are not benzine soluble. In order words, the phenol substance may also consist of p-cresol or p-benzylphenol. Treating neutral resins by reacting them with such condensation products from p-cresol has hitherto been unknown, but para-cresol derivatives have solely been employed to act on acid natural resins.

Intermediate products which are not only suitable for being reacted with resins but also with fatty oils, etc., are those obtained from p-substituted phenols with a larger aliphatic radicle. These can also be worked up with melts of resin and fatty oils. The resins to be treated can also be dissolved in inert solvents. Moreover the incorporation of the condensation products can be effected at increased or diminished, instead of ordinary, pressure, or in the presence of inert gases.

For the sake of completeness it may be mentioned that the resins obtained by the acid method, i. e., such as belong to the so called "Novolak" type, also can be melted with other artificial or natural, unaltered or more or less altered resins, such as coumarone resin, colophony, resin esters, resinates, fused copal, etc., but as no reaction takes place in this case the melt mainly constitutes a mixture of the two components and no increase of melting point or any other improvement can be observed during the melting process, even when heating at high temperatures.

*Example 1*

150 grms. of p-tertiary-butylphenol, prepared according to the Liebmann method (Ber. 14, p. 1842 and 15, p. 150) from isobutyl alcohol, phenol and zinc chloride, or in any other way, are heated to boiling with 95 grms. of 30% formaldehyde, in presence of 10 grms. of concentrated hydrochloric acid, for 8–10 hours under a reflux condenser. Finally, the aqueous liquid is separated from the condensation product (which is already almost solid at boiling temperature), and the latter is dehydrated by heating. A nearly water-white resin is obtained, of high melting point, very fast to light, and soluble in benzine and the like in any proportion.

Example 2

108 grms. of cresol American U. S. P., 80 grms. of cyclohexanol and 150 grms. of zinc chloride are heated at 180° for three-quarters of an hour. Water is added after cooling, and the reaction product is separated from the aqueous solution of zinc chloride, being thereafter condensed (after having been distilled) with 40 grms. of paracet-aldehyde with the aid of strong mineral acids. The water is finally eliminated and the resin is preferably freed from any uncondensed substances, in a current of steam. The resin is of high melting point, pale color and soluble in benzine.

Example 3

82 grms. of p-tertiary-amylphenol (prepared for example from equimolecular proportions of phenol and tertiary amyl chloride with a little AlCl$_3$) are dissolved to a clear solution in 90 grms. of 30% formaldehyde and 75 cc. of 3n-NaOH, by gentle warming. The charge is maintained at 50-55° C. for about 24 hours, and the viscous oily reaction product is precipitated by any acid, seprated from the supernatant aqueous liquid and dried in the water bath. When placed in moulds it can be transformed, under pressure (in autoclaves), into a very hard, infusible resin. Before and after this treatment it is extremely fast to light.

Example 4

75 grms. of p-tertiary-butylphenol are condensed for several hours at 100° C. with 50 grms. of 30% formaldehyde and 7.5 grms. of concentrated ammonia, until a clear, viscous resin has been formed, which can easily be separated from the aqueous liquid. It is of a pale lemon-yellow color, and is soluble in benzine and the like in all proportions. On being heated, it passes over into the infusible and insoluble form.

Example 5

20 grams of the still moist product obtained as in Example 3, are gradually introduced into 100 grms. of fused coumarone resin (soluble in benzine and with the melting point 50-55° C.), the temperature being finally raised to 200° C. The resulting resin, which, if carefully prepared, is pale and soluble in benzine, melts at about 20° C. higher than the originating resin.

Example 6

100 grms. of purified Montan wax are treated in the same way as the above coumarone resin. The resulting wax has a considerably higher melting point, and is also much tougher and harder.

Example 7

100 grms. of China-wood oil are treated with 12 grms. of an alkali-condensed product of p-tertiary-butylphenol and formaldehyde, the temperature being finally raised to about 200° C. for a short time. The resulting product has the viscosity of thin stand oil and, when mixed with a suitable amount of drier, dries in about an hour (also in the warm) to a clear film of excellent properties.

Example 8

100 grms. of colophony-glycerol ester, with an acid value below 8 are melted with 25 grms. of a viscous oily condensation product obtained from p-benzylphenol and formaldehyde in excess of the equimolecular quantity in presence of alkali. The p-benzylphenol is prepared by the action of molecular quantities of phenol and benzyl chloride in presence of zinc chloride. The fusion of the condensation product with the colophony ester furnishes a perfectly clear resin, melting at about 40° C. higher than the ester, and being very satisfactorily soluble in benzine.

Example 9

100 grms. of dammar resin (M. P. 68/75° C. and acid value 24) are dissolved warm or melted in 20 grms. of mineral spirits, and a phenol-formaldehyde condensation product as in Examples 3, 7 and 8 is gradually added at over 100° C. If the operation be properly carried out, the pale color of the dammar resin will scarcely suffer and the product is equally fast to light and soluble, but at the same time has a higher melting point and is harder.

The present application is also a continuation in part of my application Serial No. 459,845, filed June 7, 1930, now Patent No. 1,870,455, granted Aug. 9, 1932, and of my application Serial No. 506,296, filed January 2, 1931.

What I claim is:

1. A process of producing a clear homogeneous artificial resin which comprises reacting a condensation product of the heat hardening type derived from a phenol substituted in the para-position by a hydrocarbon radicle and formaldehyde with an excess of a substantially neutral ester obtained from a natural resin acid and a polyhydric alcohol.

2. A process which comprises reacting a colophony-glycerol ester with a benzine soluble condensation product of the heat hardening type obtained by condensing together, in the presence of an alkali, formaldehyde and a phenol substituted in the para-position by a tertiary-alkyl radicle.

3. A process as set forth in claim 1, wherein the phenol employed is para-cresol.

4. A process as set forth in claim 1, wherein the phenol employed is substituted in the para-position by a tertiary-alkyl radicle.

5. A process which consists in reacting together a substantially neutral benzine soluble resinous ester which is a member of the group consisting of ester-like natural resins and esters obtained from acidic natural resins and polyhydric alcohols, with a relatively small proportion of a benzine soluble condensation product of the heat hardening type obtained from formaldehyde and a phenol substituted in the para-position by a saturated hydrocarbon radicle having at least four carbon atoms.

6. A clear homogeneous resinous complex which consists of a substantially neutral resinous ester which is a member of the group consisting of ester-like natural resins and esters obtained from acidic natural resins and polyhydric alcohols, reacted with a relatively small proportion of a benzine soluble condensation product of the heat hardening type obtained from formaldehyde and a phenol substituted in the para-position by a saturated hydrocarbon radicle having at least four carbon atoms.

7. A process which consists in reacting together a substantially neutral resinous ester which is a member of the group consisting of ester-like natural resins and esters obtained from acidic natural resins and polyhydric alcohols, with a relatively small proportion of a benzine soluble condensation product of the heat hardening type obtained from formaldehyde and a phenol substituted in the para-position by a saturated hydrocarbon radicle having at least four carbon atoms.

8. A clear homogeneous resinous complex which consists of a substantially neutral resinous ester which is a member of the group consisting of ester-like natural resins and esters obtained from acidic natural resins and polyhydric alcohols, reacted with a relatively small proportion of a condensation product of the heat hardening type obtained from formaldehyde and a phenol substituted in the para-position by a hydrocarbon radicle.

9. A process which consists in reacting together a substantially neutral resinous ester which is a member of the group consisting of ester-like natural resins and esters obtained from acidic natural resins and polyhydric alcohols, with a relatively small proportion of a condensation product of the heat hardening type obtained from formaldehyde and a phenol substituted in the para-position by a hydrocarbon radicle.

10. A resinous product comprising a substantially neutral fusible and soluble resin and a benzine soluble condensation product obtained by condensing together with formaldehyde a phenol substituted in the para-position by a saturated hydrocarbon radicle containing more than three carbon atoms.

11. A process which comprises reacting a substantially neutral fusible and soluble resin with a benzine soluble condensation product obtained by condensing together with formaldehyde a phenol substituted in the para-position by a saturated hydrocarbon radicle containing more than three carbon atoms.

12. A homogeneous resinous complex which comprises a substantially neutral artificial fusible and soluble resin reacted with a benzine soluble condensation product obtained from formaldehyde and a phenol substituted in the para-position by a saturated hydrocarbon radicle containing more than three carbon atoms.

13. A homogeneous resinous complex which comprises a substantially neutral, natural resin reacted with a relatively small proportion of a benzine soluble condensation product obtained from formaldehyde and a phenol substituted in the para-position by a saturated hydrocarbon radicle containing more than three carbon atoms.

14. A process which comprises reacting a substantially neutral artificial fusible and soluble resin with a benzine soluble condensation product of the heat hardening type obtained by condensing together with formaldehyde a phenol substituted in the para-position by a saturated hydrocarbon radicle containing more than three carbon atoms.

15. A process which comprises reacting a substantially neutral natural resin with a benzine soluble condensation product of the heat hardening type obtained by condensing together formaldehyde and a phenol substituted in the para-position by a saturated hydrocarbon radicle containing more than three carbon atoms.

16. A homogeneous resinous complex readily soluble in benzine, which consists of a substantially neutral benzine soluble resinous ester which is a member of a group consisting of ester-like natural resins and esters obtained from acidic natural resins and polyhydric alcohols, reacted with a relatively small proportion of a benzine soluble condensation product of the heat hardening type obtained from formaldehyde and a phenol substituted in the para-position by a saturated hydrocarbon radicle having at least four carbon atoms.

17. A process as set forth in claim 1 in which the natural resin acid is colophony.

18. A process as set forth in claim 1 in which the polyhydric alcohol is glycerol.

19. A process of producing a clear homogeneous artificial resin soluble in benzine, which comprises reacting a condensation product of the heat hardening type derived from a phenol substituted in the para-position by a hydrocarbon radicle and formaldehyde with an excess of a substantially neutral colophony-glycerol ester.

20. A process as set forth in claim 1 wherein the phenol employed is para-benzyl-phenol.

21. A process of producing a clear homogeneous artificial resin soluble in benzine which comprises reacting (1) a condensation product of the heat hardening type derived from the para-benzyl-phenol and formaldehyde with (2) an excess of colophony-glycerol ester.

22. A clear homogeneous artificial resin soluble in benzine, comprising the reaction product of (1) a condensation product of the heat hardening type obtained from formaldehyde and a phenol substituted in the para-position by a hydrocarbon radicle and (2) an excess of a substantially neutral colophony-glycerol ester; the final resin having a melting point about 40° C. higher than the ester.

23. A process which comprises reacting a colophony-glycerol ester with a benzine soluble condensation product of the heat hardening type obtained by condensing together, in the presence of an alkali, an excess of formaldehyde over the equimolecular proportion and a phenol substituted in the para-position by a saturated hydrocarbon radicle containing more than three carbon atoms.

24. A clear homogeneous artificial resin comprising the reaction product of (1) a condensation product of the heat hardening type obtained from formaldehyde and a phenol substituted in the para-position by a hydrocarbon radicle and (2) an excess of a substantially neutral ester obtained from a natural resin and a polyhydric alcohol, the final resin having a substantially higher melting point than the mere mixture of the ester with said condensation product.

25. A homogeneous resinous complex readily soluble in benzine, which comprises a substantially neutral colophony-glycerol ester reacted with a relatively small proportion of a benzine soluble condensation product of the heat hardening type obtained from formaldehyde and a phenol substituted in the para-position by a saturated hydrocarbon radicle having at least four carbon atoms.

26. A homogeneous clear artificial resin which comprises the reaction product of (1) an ester of a natural acidic resin, and a polyhydric alcohol and (2) a benzine soluble condensation product of the heat hardening type obtained from a phenol substituted in the para-position by a saturated hydrocarbon radicle containing more than three carbon atoms, and formaldehyde in excess of the equimolecular quantity.

27. A homogeneous clear artificial resin readily soluble in benzine, which comprises the reaction product of (1) a colophony glycerol ester, and (2)

a benzine soluble condensation product of the heat hardening type obtained from a phenol substituted in the para-position by a saturated hydrocarbon radicle containing more than three carbon atoms, and formaldehyde in excess of the equimolecular quantity.

28. A homogeneous resinous complex, which comprises a substantially neutral fusible and soluble resin reacted with a relatively small proportion of a condensation product of the heat hardening type obtained from formaldehyde and a phenol substituted in the para-position by a hydrocarbon radicle.

29. A process for producing a clear homogeneous artificial resin, which comprises reacting a condensation product of the heat hardening type derived from a phenol substituted in the para-position by a hydrocarbon radicle and formaldehyde with an excess of a substantially neutral fusible and soluble resin.

30. A homogeneous resinous complex, which comprises a substantially neutral artificial fusible and soluble resin reacted with a relatively small proportion of a condensation product of the heat hardening type obtained from formaldehyde and a phenol substituted in the para-position by a hydrocarbon radicle.

31. A homogeneous resinous complex, which comprises a substantially neutral natural resin reacted with a relatively small proportion of a condensation product of the heat hardening type obtained from formaldehyde and a phenol substituted in the para-position by a hydrocarbon radicle.

32. A process which comprises reacting a substantially neutral artificial fusible and soluble resin with a benzine soluble condensation product obtained by condensing together with formaldehyde a phenol substituted in the para-position by a saturated hydrocarbon radicle containing more than three carbon atoms.

33. A process which comprises reacting coumarone resin with a benzine soluble condensation product obtained by condensing together, in the presence of alkali, formaldehyde and a phenol substituted in the para-position by a saturated hydrocarbon radicle containing more than three carbon atoms.

34. A process which comprises reacting coumarone resin with a benzine soluble condensation product obtained by condensing together, in the presence of an alkali, formaldehyde and a phenol substituted in the para-position by a saturated hydrocarbon radicle containing more than three carbon atoms, the formaldehyde being used in excess of the equimolecular proportion.

35. A process which comprises reacting coumarone resin with a benzine soluble condensation product obtained by condensing together formaldehyde and a para-tertiary-alkylphenol.

36. A process which comprises reacting a substantially neutral natural resin with a benzine soluble condensation product obtained by condensing together formaldehyde and a phenol substituted in the para-position by a saturated hydrocarbon radicle containing more than three carbon atoms.

37. A process which comprises reacting dammar resin with a relatively small proportion of a condensation product of the heat hardening type obtained by condensing together, in the presence of an alkali, formaldehyde and a phenol substituted in the para-position by a hydrocarbon radicle.

38. A process which comprises reacting dammar resin with a benzine soluble condensation product obtained by condensing together formaldehyde and a para-tertiary-alkylphenol.

39. A coating composition prepared from the artificial resin defined in claim 27.

40. A coating composition prepared from the resinous complex defined in claim 28.

41. A coating composition prepared from the artificial resin defined in claim 10.

42. A coating composition prepared from the resinous complex defined in claim 16.

43. A process for the production of condensation products which comprises condensing with an aldehyde, a phenol substituted in the para-position by a hydroaromatic radical, in the absence of unsubstituted phenol.

44. A condensation product produced according to claim 43.

45. A process for the production of condensation products which comprises condensing with an aldehyde, a phenol substituted in the para position by the cyclohexyl group.

46. A resinous condensation product produced according to claim 45.

47. A process for the production of condensation products, which comprises condensing an aldehyde with a mixture consisting of a phenol substituted in the para-position by the cyclohexyl group and of para-cresol.

48. A condensation product produced according to claim 47.

49. A process for the production of condensation products which comprises condensing an aldehyde with the product obtained by reacting cresol and cyclohexanol.

50. A resinous condensation product produced according to claim 49.

HERBERT HÖNEL.